(12) United States Patent
Patel et al.

(10) Patent No.: US 9,240,823 B2
(45) Date of Patent: Jan. 19, 2016

(54) RECEIVER, APPARATUS, AND METHODS FOR WIRELESSLY RECEIVING DATA FROM A POWER INFRASTRUCTURE

(71) Applicant: University of Washington through its Center for Commercialization, Seattle, WA (US)

(72) Inventors: Shwetak N. Patel, Seattle, WA (US); Gabriel A. Cohn, Sammamish, WA (US); Matthew S. Reynolds, Durham, NC (US)

(73) Assignee: University of Washington Through Its Center for Commercialization, Seattle, WA (US)

( * ) Notice: Subject to any disclaimer, the term of this patent is extended or adjusted under 35 U.S.C. 154(b) by 0 days.

(21) Appl. No.: 14/747,963

(22) Filed: Jun. 23, 2015

(65) Prior Publication Data

US 2015/0326280 A1    Nov. 12, 2015

Related U.S. Application Data

(62) Division of application No. 14/024,401, filed on Sep. 11, 2013, now Pat. No. 9,064,396.

(60) Provisional application No. 61/699,618, filed on Sep. 11, 2012, provisional application No. 61/699,631, filed on Sep. 11, 2012.

(51) Int. Cl.
*H04B 3/00* (2006.01)
*H04B 3/54* (2006.01)
(Continued)

(52) U.S. Cl.
CPC ............. *H04B 3/542* (2013.01); *H04L 27/14* (2013.01); *H04W 24/08* (2013.01)

(58) Field of Classification Search
CPC ........ H04B 3/542; H04L 27/14; H04W 24/08
USPC ........................................................ 375/257
See application file for complete search history.

(56) References Cited

U.S. PATENT DOCUMENTS

| 5,559,377 A | 9/1996 | Abraham |
| 6,236,674 B1 | 5/2001 | Morelli et al. |

(Continued)

FOREIGN PATENT DOCUMENTS

| WO | 01/37438 A1 | 5/2001 |
| WO | 2012/021546 A1 | 2/2012 |

OTHER PUBLICATIONS

"International Search Report and Written Opinion for PCT/US2013/059234 mailed Dec. 10, 2013".

(Continued)

*Primary Examiner* — Juan A Torres
(74) *Attorney, Agent, or Firm* — Dorsey & Whitney LLP (57) ABSTRACT

Apparatuses, receivers, systems and methods for receiving data via a power line infrastructure. An exemplary apparatus includes a base station configured to receive a signal from a power line of a structure by coupling to the power line through an electrical outlet. The base station may include an impedance matching circuit configured to match an impedance of the power line of the structure, and a receiver coupled to the impedance matching circuit. The receiver may be configured to demodulate the signal received from the power line of the structure, convert the demodulated signal into a digital signal, and provide the digital signal to a decoder.

20 Claims, 6 Drawing Sheets

(51) Int. Cl.
*H04W 24/08* (2009.01)
*H04L 27/14* (2006.01)

(56) References Cited

U.S. PATENT DOCUMENTS

| | | | |
|---|---|---|---|
| 6,441,723 | B1 | 8/2002 | Mansfield, Jr. et al. |
| 7,656,970 | B1 | 2/2010 | Sankabathula et al. |
| 7,904,108 | B2 | 3/2011 | Castaneda et al. |
| 8,788,191 | B1 | 7/2014 | Stuntebeck et al. |
| 9,064,396 | B2 | 6/2015 | Patel et al. |
| 2004/0160309 | A1 | 8/2004 | Stilp |
| 2004/0212503 | A1 | 10/2004 | Stilp |
| 2009/0122779 | A1 | 5/2009 | Gonzalez-Velazquez |
| 2010/0073038 | A1 | 3/2010 | Pagnanelli |
| 2010/0203847 | A1 | 8/2010 | Gorbachov |
| 2011/0128995 | A1 | 6/2011 | Sanji et al. |
| 2012/0119923 | A1 | 5/2012 | Van Wyk et al. |
| 2012/0134394 | A1 | 5/2012 | Allen |
| 2013/0107919 | A1 | 5/2013 | Burns et al. |
| 2013/0301497 | A1 | 11/2013 | Gonkiberg et al. |
| 2014/0072060 | A1 | 3/2014 | Patel et al. |

OTHER PUBLICATIONS

Cohn, et al., "SNUPI: Sensor Nodes Utilizing Powerline Infrastructure", Ubicomp '10 Proceedings of the 12th ACM international conference on Ubiquitous computing, 2010, 159-168.

French, Catherine A. "Distance Preserving Run-Length Limited Codes", IEEE Transactions on Magnetics, vol. 25, No. 5,, Sep. 1989, 4093-4095.

French, Catherine A. et al., "Performance Comparison of Combined ECC/RLL Codes", IEEE International Conference on Communications ICC '90 Including Supercomm Technical Sessions. SUPERCOMM ICC '90 Conference Record., vol. 4, Apr. 1990, 1717-1722.

Gupta, Sidhant, "ElectriSense: Single-Point Sensing Using EMI for Electrical Event Detection and Classification in the Home", UbiComp 2010, Copenhagen, Denmark, Sep. 26-29, 2010, 139-149.

Immink, "Runlength-Limited Sequences", Proceedings of the IEEE, vol. 78, No. 11, Nov. 1990, 1745-1759.

Lin, et al., "Combined ECC/RLL Codes", IEEE Transactions on Magnets, vol. 24, No. 6, Nov. 1988, 2527-2529.

Patel, Shwetak N. et al., "At the Flick of a Switch: Detecting and Classifying Unique Electrical Events on the Residential Power Line", Proc. UbiComp 07, Nominated for the Best Paper Award), 2007, 271-288.

Patel, Shwetak N. et al., "Detecting Human Movement by Differential Air Pressure Sensing in HVAC System Ductwork: An Exploration in Infrastructure Mediated Sensing", J. Indulska et al. (Eds.): Prevasive 2008, LNCS 5013, 2008, 1-18.

Patel, Shwetak N. et al., "PL-Tags: Detecting Batteryless Tags through the Power Lines in a Building", H. Tokuda et al. (eds.): Pervasive 2009, LNCS 5538, 2009, 256-273.

Smith, Joshua R. "A Wirelessly-Powered Platform for Sensing and Computation", P. Dourish and A. Friday (Eds.): Ubicomp 2006, LNCS 4206, 2006, 495-506.

Stuntebeck, Erich P. et al., "Wideban PowerLine Position for Indoor Localization", UbiComp '08, Seoul, Korea, Sep. 21-24, 2008, 94-103.

RECEIVER, APPARATUS, AND METHODS FOR WIRELESSLY RECEIVING DATA FROM A POWER INFRASTRUCTURE

CROSS REFERENCE TO RELATED APPLICATIONS

This application is a divisional of U.S. patent application Ser. No. 14/024,401, filed on Sep. 11, 2013 and issued as U.S. Pat. No. 9,064,396, on Jun. 23, 2015, which claims the benefit of the earlier filing date of U.S. Provisional Application No. 61/699,631 and U.S. Provisional Application No. 61/699,618, both filed on Sep. 11, 2012, which are incorporated herein by reference in their entirety and for all purposes.

TECHNICAL FIELD

Examples described herein are directed generally to receiving and decoding wireless data. Examples are described that receive data wirelessly using a base station that utilizes preexisting power line installations as a wireless antenna receiving communication from a transmitter.

BACKGROUND

There have been many attempts to achieve building-wide sensing and monitoring of environmental conditions such as heat, humidity, light, and other measurable conditions. Despite rapid advances in computing power and technology, there has not been a successful product that enables a home owner or building manager to monitor various conditions within a building outside of such devices as thermostats. Many conventional sensing systems are too expensive or require too much expertise or supervision to reach widespread appeal. For example, among the many barriers to this type of system is the battery life of sensors. It is impractical for many consumers to replace dozens of batteries even as infrequently as once every one or two years. Accordingly, most homeowners and building managers do not employ any sort of building-wide sensor system and, accordingly, are often unaware of many potentially dangerous conditions in their homes or buildings. Humidity, vapor presence, unnecessary light usage, and rodent and insect infestations are all examples of expensive and potentially dangerous conditions that may be detected with a proper sensing mechanism. In many instances, however, such conditions are not monitored because of the above-mentioned constraints and shortcomings of conventional sensing systems.

DETAILED DESCRIPTION

Certain specific details are set forth in the following description and in FIGS. 1-6 to provide a thorough understanding of various embodiments of the technology. Other details including well-known structures and systems often associated with sensors, transmitters, receivers, have not been set forth in the following disclosure to avoid unnecessarily obscuring the description of the various embodiments of the technology. Many of the details, dimensions, angles, and other features shown in the figures are merely illustrative of particular embodiments of the technology. Accordingly, other embodiments can have other details, dimensions, angles, and features without departing from the spirit or scope of the present technology. A person of ordinary skill in the art, therefore, will accordingly understand that the technology may have other embodiments with additional elements, or the technology may have other embodiments without several of the features shown and described below with reference to FIG. 1-6.

Examples described herein include base stations utilizing power infrastructures and associated systems and methods. In several embodiments, for example, a system can include a base station that is operably connected to a preexisting power line installation of a building or other structure, and a plurality of sensor nodes. The sensor nodes can be configured to wirelessly transmit information to the base station using the preexisting power line installation as a receiving antenna. Electrical signals can be wirelessly delivered to the preexisting power line installation, which carries the signals to the base station, where the information is parsed and delivered to a user in a format that enables the user to respond properly to the monitored condition.

The preexisting power line installation may include the electrical wiring installed in the walls, floor, and/or ceiling of a building. In some embodiments, no change to the preexisting power line installation may be required to receive a signal from the sensor nodes, or to plug the base station into an electrical outlet in the building and receive information from the sensor nodes. In some embodiments, the sensor nodes are small, self-contained units (e.g., approximately one inch square and approximately one-half inch thick) that can be placed virtually anywhere in the building.

Examples described herein include a receiver that receives data via a power line receiving antenna using a long-range, near-field transmission. The receiving antenna may be a preexisting electrically conductive structure of a building (e.g., a powerline infrastructure). Examples described herein may also include methods of decoding an electrical signal received via the power line to retrieve a packet of data that was encoded and transmitted via a sensor node.

Figure 1:
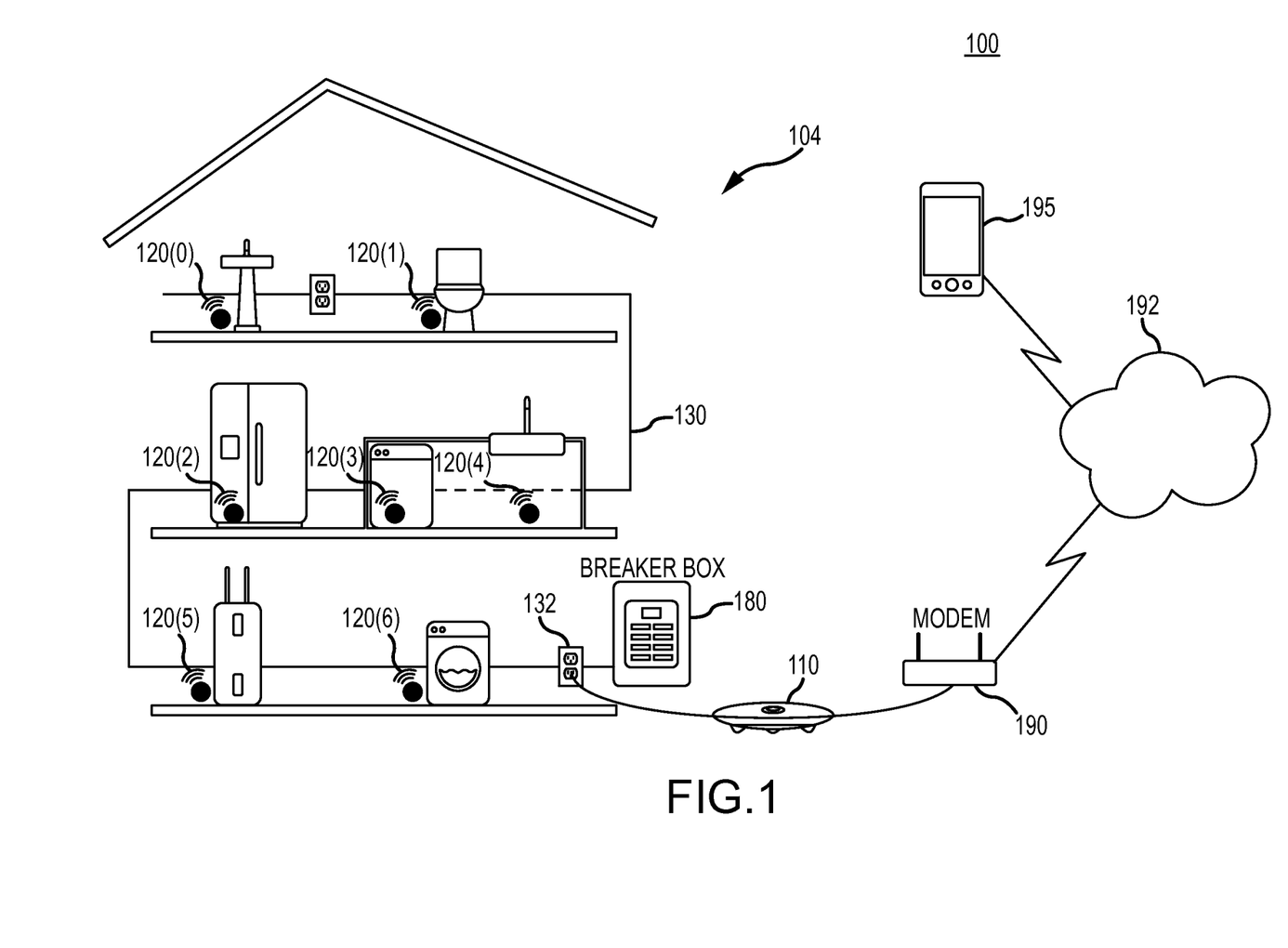
FIG. 1 is a block diagram of a sensing system including sensing nodes and a base station according to an embodiment of the disclosure.

FIG. 1 is an illustrative example of a sensing system 100 deployed in a sample building 104 having a preexisting power line 130 installed therein in accordance with an embodiment of the present disclosure. Several sensor nodes 120(0-6) can be positioned as desired throughout the building 104 and can be deployed to detect various environmental conditions. One or more base stations 110 can be deployed around the building 104 to gather data from the sensor nodes 120(0-6). In some embodiments, for example, the base station(s) 110 can be positioned centrally in the building 104 to reduce the overall distance between any given sensor node 120(0-6) and the nearest base station 110. In other embodiments, however, the base station(s) 110 may have a different arrangement relative to the sensor node(s) 120(0-6) and/or building 104.

The dimensions of the building 104 and the power line 130 installation can govern the placement of the sensor nodes 120(0-6) and the base station(s) 110, in some examples. For example, a small, square building may have a single, centrally located base station, whereas a floor plan with a more complex shape may have two or more base stations to communicate effectively with the distributed sensor nodes 120(0-6). The base station(s) 110 can draw power from the electrical outlet 132 and can accordingly power a larger transmission mechanism that can transmit data to a computer over Bluetooth, Wi-Fi, or other suitable wireless data communication means. In some embodiments, the base station(s) 110 can include sufficient computing power to process the data and may issue an alert if one of the sensor nodes 120(0-6) reports a condition that requires attention. In other embodiments, the base station 110 may provide data to another electronic device 195 (e.g., a mobile phone) via a network 192 and/or a modem 190, and the electronic device 195 may process the data to provide an alert.

Figure 2:
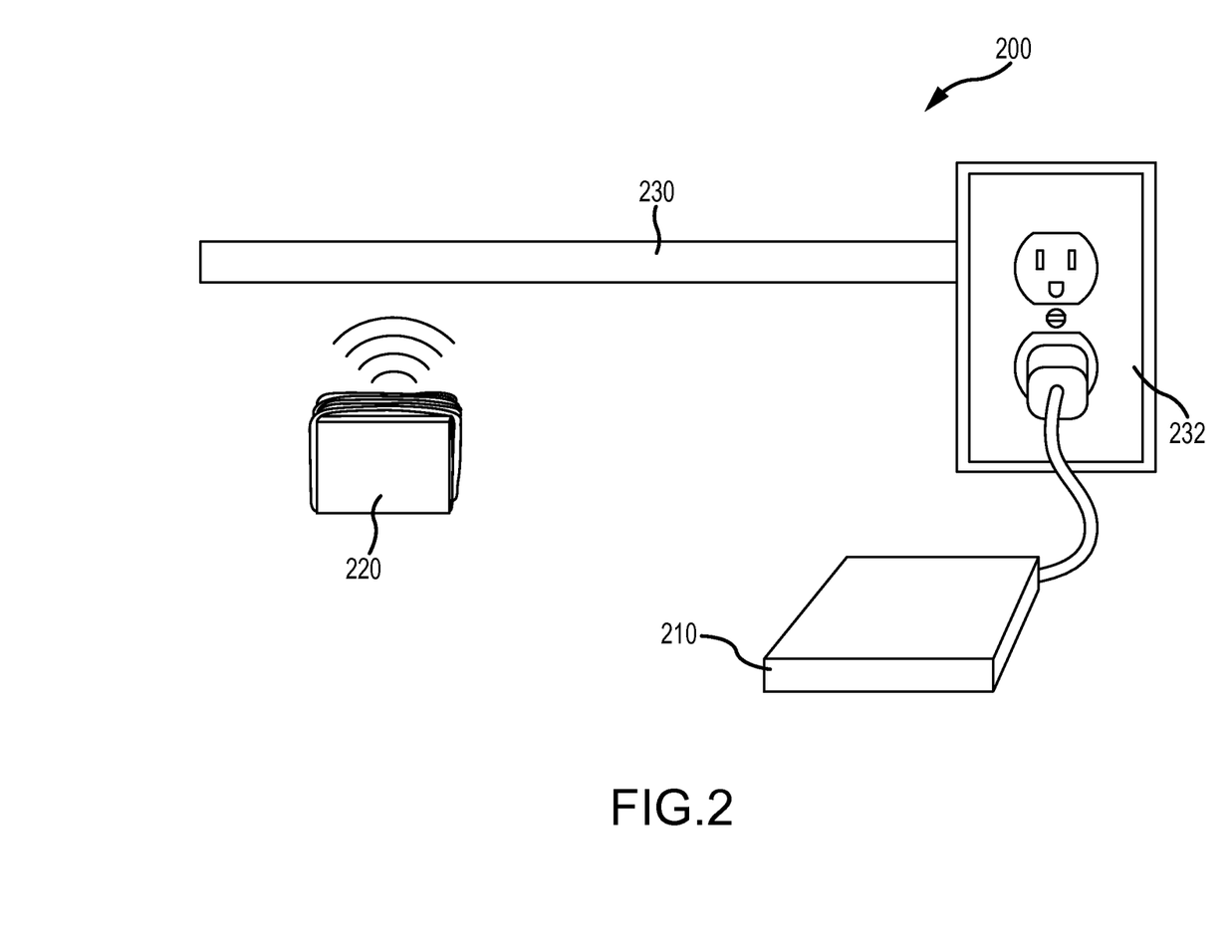
FIG. 2 is a block diagram of a sensing system including sensing nodes and a base station according to an embodiment of the disclosure.

FIG. 2 is a schematic view of a sensing system 200 configured in accordance with embodiments of the present disclosure. The sensing system 200 includes a base station 210 and one or more sensor nodes 220 (only a single sensor node 220 is shown in the illustrated embodiment). The base station 110 is electrically connected to a power line 230, such as a power line in a house or building. In some embodiments, for example, the base station 210 can be plugged into a conventional power outlet 232. In other embodiments, however, the base station 210 may be electrically connected to the power line 230 using a different arrangement and/or be powered using other suitable techniques. The power line 230 can be generally defined as any suitable electrically conductive structure capable of carrying an electrical signal. For example, the power line 230 can include electrically conductive plumbing such as copper pipes, electrical structures in a building such as rebar, or other structural components. The power line 230 can also include appliances such as dishwashers, televisions, lamps, or other appliances that are electrically connected to electrical structures in the building.

The sensor nodes 220 may be positioned throughout a house, building, or other structure where they can successfully transmit data to the power line 230. For example, the sensor nodes 220 can be positioned near walls having installed power lines 230, or near electrically conductive plumbing, or near any other electrically conductive structure to reduce the distance over which the sensor nodes 220 must transmit a signal. The distance between the sensor nodes 220 and the nearest power line 230 can be relatively large, but due to the long wavelength of the receiving antenna (e.g., approximately 11 meters), the transmission is still considered to be a near-field transmission. The sensor nodes 220 are generally positioned where they can detect an environmental condition. For example, if sensor nodes are employed to detect humidity, one or more sensor nodes 220 can be positioned in a basement or other place where humidity is likely to accumulate. In other embodiments, the sensor nodes 220 can be carried by a human or other living organism, and can be configured to detect a biological characteristic of the living organism. The sensor nodes 220 can gather data regarding the environmental condition and relay the data wirelessly to the power line 230, and the power line 230 can carry the signal back to the base station 210. In some embodiments, the base station 210 can transmit a signal back to the sensor node 220.

In some embodiments, the sensor nodes 220 can transmit data to the power line 230 at a relatively low frequency, such as approximately 13.56 MHz, 27.12 MHz, or another suitable frequency. The sensing system can be used on virtually any suitable frequency, although many frequencies may be occupied or otherwise inaccessible due to local regulations. By some measurements, this transmission frequency may be considered inefficient. However, existing power lines 230, such as electrical installations and the like, are comparatively large and therefore are very efficient receiving antennas. The resulting wireless transmission is accordingly a long-range, near-field transmission. The sensor node 220 can be positioned within a house or building where the power line 230 of the building generally surrounds individual sensor nodes 220. The wireless transmission may be considered "long-range" because, in at least some aspects, the distance from the sensor node 220 to the base station 210 is large compared to the dimensions of the sensor node 220. The wireless transmission may be considered "near-field" because the distance between the sensor node 220 and the power line 230, which is the receiving antenna, is generally smaller than approximately 1.5 times the wavelength of the receiving antenna (e.g., at 27 MHz, the wavelength is approximately 11 meters). In other embodiments, however, the sensor node 220 may transmit data using different frequencies.

Figure 3:
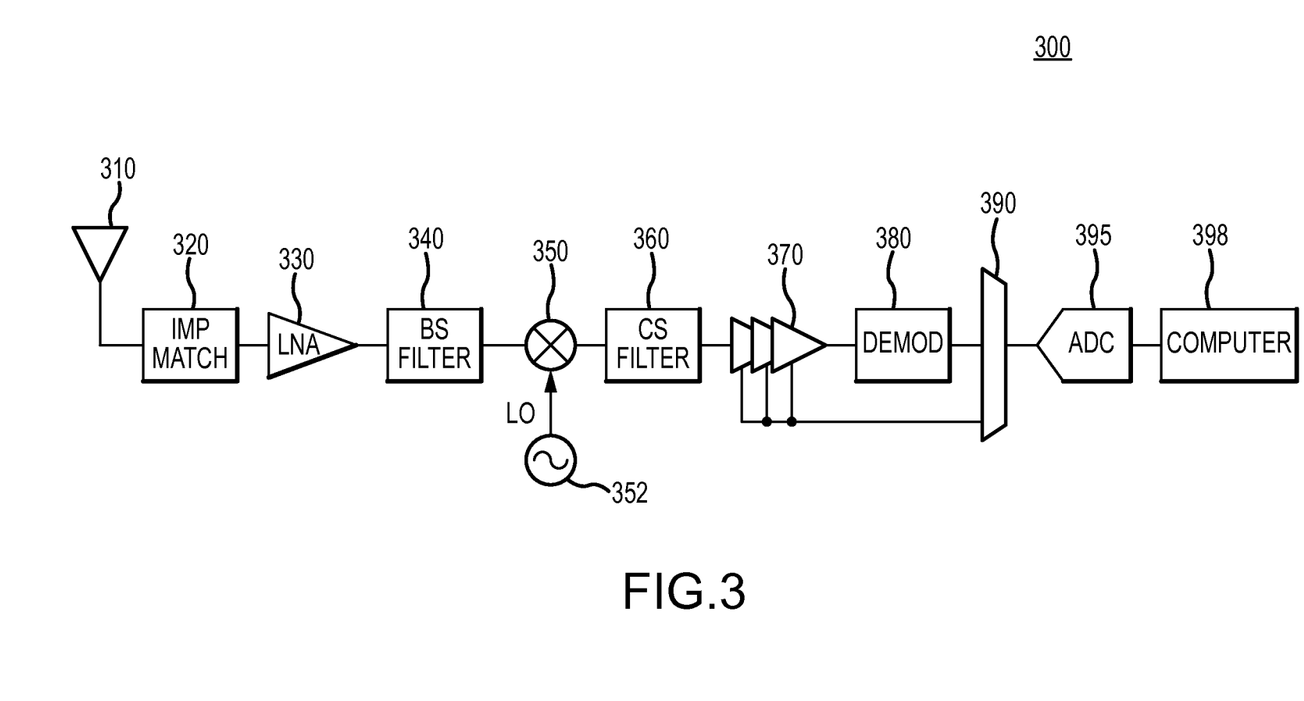
FIG. 3 is a block diagram of a receiver according to an embodiment of the disclosure.

FIG. 3 is a block diagram of a receiver 300 in accordance with an embodiment of this disclosure. The receiver 300 may be included in the base station 110 of FIGS. 1 and 2. The receiver 300 may receive an electrical signal via an antenna 310, where the antenna 310 includes a power line. The data packet may be wirelessly transmitted to the power line via a sensor node. The receiver may include an impedance matching circuit 320 coupled to the antenna 310 that is configured to match the impedance of the antenna 310. The receiver may be configured to demodulate the electrical signal at a demodulator 380, and decode the demodulated signal at a computer 398. In some examples, the receiver 300 may be implemented using a single-conversion super-heterodyne receiver architecture. In some embodiments, the receiver may be implemented using a MELEXIS TH7122 analog integrated circuit, which may be designed to be a FSK/FM/ASK transceiver for 13 930 MHz.

The impedance matching circuit 320 may be coupled to a low noise amplifier (LNA) 330. The LNA 330 may provide some initial gain to the signal from the impedance matching circuit 320. The LNA 330 may provide an output signal a band select filter 340, which may further filters a carrier frequency of the electrical signal received via the antenna 310. The filtered output from the band select filter 340 may be mixed with a local oscillator 352 at a mixer 350 to down-convert the carrier frequency to an intermediate frequency (IF). The IF may be a frequency required by the demodulator 380 to demodulate the signal. In some embodiments, the IF may be 10.7 MHz. The local oscillator 352 may be a generated and controlled using a phase-locked loop (PLL) frequency synthesizer. For example, the local oscillator 352 may include an integer-N PLL frequency synthesizer, which includes a reference oscillator for the PLL that uses an external crystal resonator. The frequency of the local oscillator may be configurable, such as by software. In some embodiments, the PLL may be designed to produce a voltage-controlled oscillator (VCO) frequency between 300 and 930 Hz. An external loop filter of the local oscillator 352 may be modified to contain a varactor diode to generate a desired VCO frequency (e.g., the transmission frequency of the sensor node, such as 13.56 or 27.12 MHz).

The IF signal may be provided to a channel select filter 360, which may filter the IF signal with a band around the IF. The channel select filter 360 may include a ceramic filter with a center frequency of 10.7 MHz, and a bandwidth of 20 kHz. A limiting IF amplifier (IFA) 370 may amplify the signal output from the channel select filter 360 and provide the amplified signal to a demodulator 380. In some embodiments, the gain provided by the IFA 370 may be 80 dB. The IFA 370 may also generate a received signal strength indicator (RSSI) signal, and provide the generated RSSI signal to a multiplexer 390. The RSSI signal may be used by the decoder of the computer 398 to determine whether a sensor node is transmitting (e.g., data rather than noise is being received on the antenna 310) based on a magnitude of the RSSI signal. The demodulator 380 may demodulate the received signal from the IFA 370 to produce the data output signal. The data output signal may be provided to the multiplexer 390. In some embodiments, the demodulator 380 may be implemented using a phase-coincidence frequency-shift-keying (FSK) demodulator. The demodulator 380 may use an external 10.7 MHz ceramic filter/ceramic discriminator with a bandwidth of 155 kHz. In addition, the demodulator 380 may include a data slicer with a resistance-capacitance (RC) time constant of 300 μs. The multiplexer 390 may provide the data output signal and the RSSI signal to an analog-to-digital converter (ADC) 395. In some embodiments, the receiver 300 may include two ADCs (e.g., one for the each of the RSSI signal and one for the data output signal), and the IFA 370 may provide the RSSI signal directly to the first ADC and the demodulator 380 may provide the data output signal directly to the second ADC. The ADC 395 may digitize both the RSSI and data output signals. The digitized RSSI and data output signals may be further processed at a computer 398, which may include a software decoder.

Figure 4A:
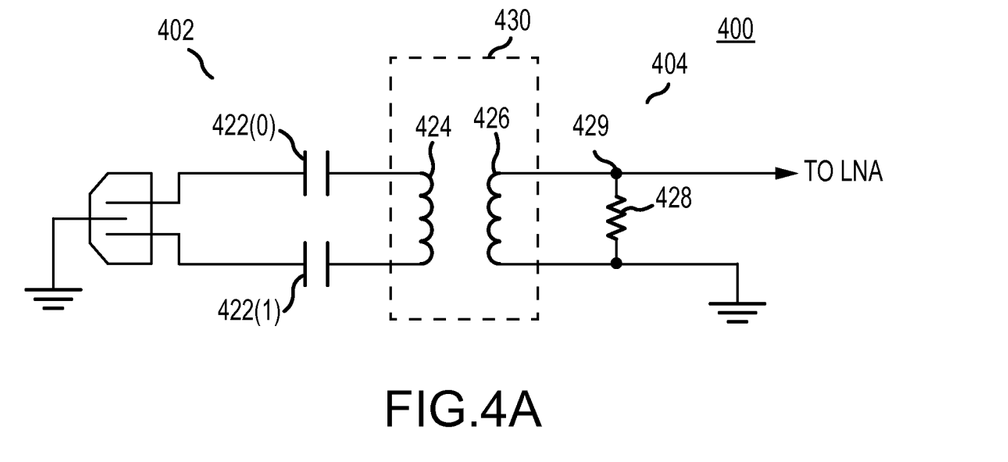
FIG. 4A is a block diagram of an impedance matching circuit according to an embodiment of the disclosure.
Figure 4B:
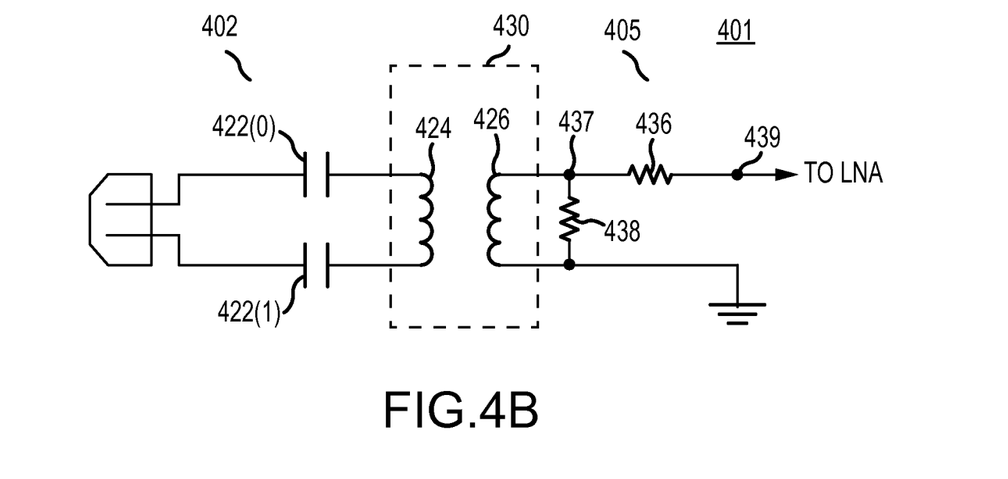
FIG. 4B is a block diagram of an impedance matching circuit according to an embodiment of the disclosure.

In operation, an electrical signal is received at the antenna 310. The antenna 310 may include a power line that acts a receiving antenna. The impedance matching circuit 320 may be designed to provide an efficient power transfer at a carrier frequency used by the transmitter (e.g., 13.56 MHz, 27.12 MHz, 44 MHz, other another frequency) to extract the signal from the power line. Because the antenna 310 includes a power line, the impedance matching circuit 320 may match the impedance of the power line to the receiver front end at the carrier frequency and significantly attenuates the 60 Hz signal (or other alternating current (AC) power frequency) used to carry power to appliances or other apparatuses on the power line. FIGS. 4A and 4B include exemplary designs of the impedance matching circuit 320.

The impedance matching circuit 400 may include a primary circuit 402 electromagnetically coupled to a secondary circuit 404 via a transformer 430. The primary circuit 402 is coupled to two nodes of a power outlet 132. While FIG. 4A depicts the primary circuit 402 coupled to neutral and hot terminals of the power outlet 132, any two terminals may be used. The primary circuit 402 may include capacitors 422(0-1) coupled in series with the primary side 424 of the transformer 430. The capacitors 422(0-1) may have an equal capacitance value. The capacitance value of the capacitors 422(0-1) may be selected to filter out the carrier frequency of the AC power supply (e.g., 10 nF for 60 Hz AC power frequency).

The secondary circuit 404 may include a resistor 428 coupled in parallel with the secondary side of the transformer 426 between output node 429 and a reference node. An output signal may be provided from the output node 429.

In operation, the capacitors 422(0-1) of the primary circuit 402 may attenuate the AC power frequency. The transformer 430 may transfer the electrical signal received via the power outlet 132 to the secondary circuit 404 through magnetic coupling. The resistor 428 may match the impedance of the power line coupled to the power outlet 132. The output node 429 may provide the output signal to the low noise amplifier LNA 330 of FIG. 3.

Similar to the impedance matching circuit 400, the impedance matching circuit 401 may include a primary circuit 402 electromagnetically coupled to a secondary circuit 405 via a transformer 430. The primary circuit 402 of impedance matching circuit 401 may be the same as the primary circuit 402 of the impedance matching circuit 400. The secondary circuit may include a resistor divider, including resistors 438 and 436, coupled to the secondary side 426 of the transformer 430. The resistor 438 may be coupled in parallel with the secondary side 426 of the transformer 430 between a node 437 and a reference node. The resistor 436 may be coupled in series between the node 437 and an output node 439. An output signal may be provided from the output node 439.

In operation, the capacitors 422(0-1) of the primary circuit 402 may attenuate the AC power frequency. The transformer 430 may transfer the electrical signal received via the power outlet 132 to the secondary circuit 405 through magnetic coupling. The resistor divider including resistors 438 and 436 may match the impedance of the power line coupled to the power outlet 132. The output node 439 may provide the output signal to the low noise amplifier LNA 330 of FIG. 3.

The impedance matching circuit 401 may have more loss at the carrier frequency of the received electrical signal than the impedance matching circuit 400, but may be able to handle more variability in the power line impedance. The impedance matching circuit 401 may also provide a better impedance match to an impedance of the receiver front-end.

Continuing with the operation of the receiver 300, the impedance matching circuit 320 may provide an output signal to the LNA 330. As explained above, the LNA 330 provides a, generally slight, amplification to the output signal of the impedance matching circuit 320, and the band select filter 340 filters out a band of frequencies around the carrier frequency. The output of the band select filter 340 is mixed with a local oscillator 352 at a mixer 350 to convert the carrier frequency of the output of the band select filter 340 an intermediate carrier frequency. For example, the local oscillator 352 may be set to an intermediate carrier frequency that is selected based on a frequency required by the demodulator 380 for demodulation of the signal.

The channel select filter 360 may filter the intermediate frequency signal with a band around the intermediate frequency, and the IFA 370 may amplify the filtered signal and provide the amplified signal to the demodulator 380. Further, the IFA 370 may provide the RSSI signal to the ADC 395 via the multiplexer 390. The demodulator 380 may demodulate the amplified signal received from the IFA 370 to provide a data output signal. The demodulator 380 may demodulate the signal based on FSK modulation, or another modulation scheme. In some embodiments, the data may be encoded at the sensor node using a run length limited (RLL) encoding scheme. This may help overcome a limitation of the receiver 300 hardware due to a time constant of the data slicer in the demodulator 380. For example, a steady-state data value tends to drift toward the mean over time. The time constant of the data slicer determines how quickly this drift occurs. Accordingly, the modulated data may be run-length limited (e.g., have a limited number of bits in a row of the same value). That is, the modulated data may not stay in either the high or low state for too long at any given time, which may aid in reducing or eliminating the aforementioned drift. There may be a maximum pulse width specified in the data output signal. Thus, sensor node may encode the data packet using an RLL encoding scheme to limit a length of a pulse width used in the encoding. The demodulator 380 may provide the data output signal to the ADC 395 via the multiplexer 390. As explained above, the ADC 395 may digitize the data output signal and the RSSI signal.

The two outputs of the ADC 395 may need to be digitized to be processed by the software decoder of the computer 398. In an embodiment, the RSSI and data signals may have a 16-bit resolution. Further, in some embodiments, the RSSI and data signals may be sampled at 240 kb/s. The digitized output data and RSSI signals may be sent to the computer 398, such as via a universal serial bus (USB), for the remainder of the processing.

A software decoder of the computer 398 may include three main components: (1) a packet parser that extracts data packets from the data output, (2) a packet decoder that decodes channel coding to reveal encoded data, and (3) a data packet checker that checks validity of the extracted data packet and separates out elements of the packet structure. In an embodiment, the software decoder may be written, at least in part, in C++/CLI (managed C++) and may run in real-time on the computer 398. Other languages or software configurations may also be used.

The packet parser may include a state machine that receives the stream of digitized data output from the ADC 395. The packet parser may extract a data sequence that represents a data packet. In some embodiments, a valid data sequence includes:

1. The RSSI signal being greater than a first set threshold. This may indicate the presence of a transmitter.
2. The data output signal crossing a second set threshold to indicate the beginning of the header sequence. In some embodiments, the data output signal may cross the threshold after a predetermined amount of time starting from the time the decoder detects the RSSI exceeding the first threshold. This built in time gap may allow the decoder to distinguish noise from a valid packet. For example the amount of time may be 2.24 ms after the RSSI exceeds the first threshold.
3. A correct header sequence. For example, the header sequence must have a long pulse followed by three short pulses. In an embodiment, the long pulse may include 7 run-length limited (RLL) bit times and the short pulses may include 3 RLL bit times (e.g., based on a RLL 2/6 encoding scheme). In other embodiments, there may be more than one long pulse and more or less than three short pulses.
4. A packet length, as determined to be the time between the end of the header sequence and the point that the RSSI drops below the active threshold. The packet length may be an expected length.

When a data sequence is found which meets all of the criteria above, the widths of the data pulses may be extracted and passed to the packet decoder.

The packet decoder may decode the pulse widths provided by the packet decoder to produce the packet data that was encoded back at the transmitter. A first step may be to compute a pulse length of a single RLL bit used to modulate the data. The pulse length of the single RLL bit may be derived based on the header sequence. For example, the header sequence may include at least three example pulses. The long pulse may be a maximum RLL pulse (e.g., an entire RLL sequence of a single logical value) according to the RLL encoding scheme used and the short pulse may represent a minimum RLL pulse length (e.g., a shortest sequence of the single logical value in an RLL sequence). In an example, the maximum pulse may be 7 and the minimum pulse may be 3.

Figure 5A:
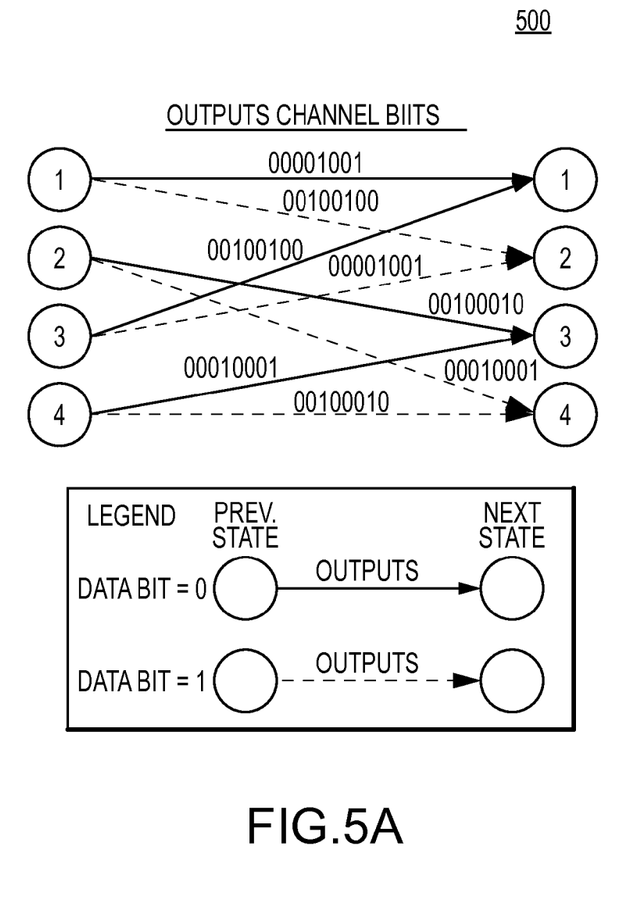
FIGS. 5A and B are diagrams of exemplary embodiments of state machines for decoding a data packet encoded using an ECC/RLL encoding scheme according to an embodiment of the disclosure.

In one embodiment, the pulse widths may be converted into a sequence of RLL bits, and then a Viterbi decoder (e.g., or another type of decoder) may be used to extract the decoded data using a state machine (e.g., a 0x1c state machine). FIG. 5A depicts a state machine 500 mapping of RLL bits based on a 2/6 RLL encoding scheme. An RLL encoding scheme is a convolutional encoding scheme. That is, next data is based on previous data. Therefore, possible valid values of next data may be limited to a set of predetermined values. As depicted in FIG. 5A, previous RLL encoded data may have a bit pattern representing one of four possible states, and for each of those states, a next possible sequence of RLL data can only properly cause the state machine to transition to one of two possible states. Any other RLL data sequence would indicate an error in the data. However, this approach may lead to errors during the conversion and decoding process. For example, small errors in the size of the pulses may produce missing or extra bits in the sequence of RLL bits, and the errors may propagate creating far too many errors for an error correction code correction scheme to handle.

Figure 5B:
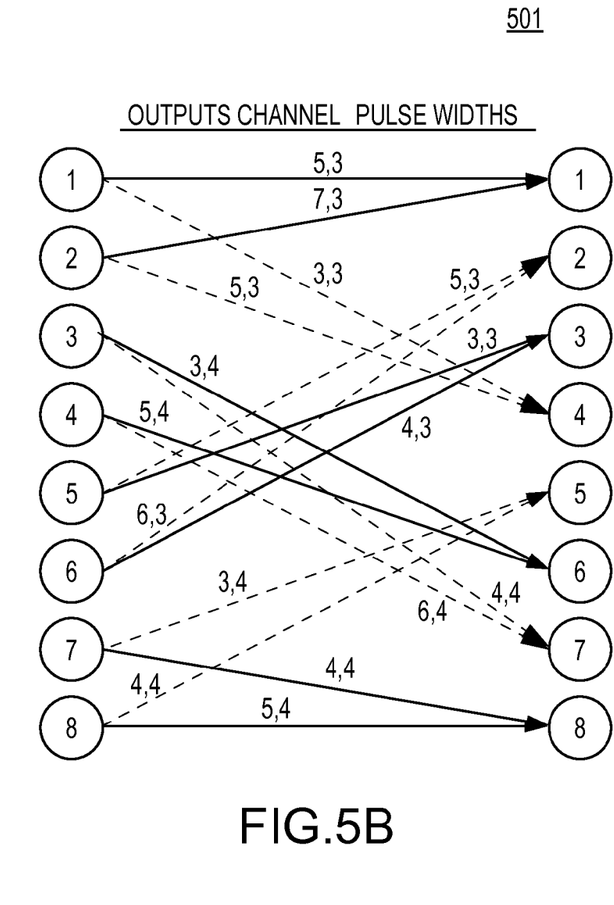

An alternative embodiment, which may be more robust to small errors in the size of the pulses, may map the state machine to a space of pulse widths, rather than ECC/RLL bits. The state diagram depicting mapping to a space of pulse widths is shown in FIG. 5B. FIG. 5B depicts a state machine 501 mapping of pulse widths associated with ECC/RLL encoded data based on a 2/6 ECC/RLL encoding scheme. As depicted in FIG. 5B, previous pulse widths associated with ECC/RLL encoded data may indicate a bit pattern representing one of eight possible states, and for each of those states, a next possible pulse width sequence associated with ECC/RLL encoded data can only properly cause the state machine to transition to one of two possible states. Any other pulse width sequence associated with ECC/RLL encoded data would indicate an error in the data. Using this state machine, a decoder (e.g., a Viterbi decoder) may be used to compute an error metric as an absolute difference between an expected pulse width (e.g., from the state machine) and an observed pulse width.

The output of the decoder may represent the original packet data. The original packet data may be passed to the packet checker. Decoding the data from the packet checker using a state machine based on the pulse widths may improve reliability as compared with decoding the data from the packet using a state machine based on bits due a higher tolerance for small pulse length variations in the bits.

The packet checker may determine whether the original packet data received from the packet decoder has any errors. In some embodiments, error checking codes, such as parity bits or cyclic redundancy check (CRC) codes, may be embedded into the original packet structure to facilitate the error checking. In addition, the packet checker may check a node identifier, a packet identifier, and/or data values for validity. If no errors are found, then the packet checker may break the packet down into each of individual parts and send them to application code for further processing.

The methods of decoding the data packet may be implemented by a field-programmable gate array (FPGA) device, an application-specific integrated circuit (ASIC), a processing unit such as a central processing unit (CPU), a digital signal processor (DSP), a controller, another hardware device, a firmware device, or any combination thereof. As an example, the method of decoding the data packet may be implemented by a computing system using, for example, one or more processing units that may execute instructions for performing the method that may be encoded on a computer readable medium. The processing units may be implemented using, e.g. processors or other circuitry capable of processing (e.g. one or more controllers or other circuitry). The computer readable medium may be transitory or non-transitory and may be implemented, for example, using any suitable electronic memory, including but not limited to, system memory, flash memory, solid state drives, hard disk drives, etc. One or more processing units and computer readable mediums encoding executable instructions may be used to implement all or portions of decoders, decoding systems, or receivers described herein.

As previously described, FIGS. 5A and 5B depict state machines used by a decoder. FIG. 5A depicts state machine values of data bit decoding for a 2/6 hybrid ECC/RLL encoding scheme. For example, when in state 1, the next received data bit determines whether the next state is state 1 or state 2. If the next data bit is a "1" (e.g., a logical high value), the next state is state 1. If the next data bit is a "0" (e.g., a logical low value), the next state is state 2. The same applies for the other states of the state machine. For example, when in state 2, the possible next states are state 3 (e.g., next data bit is a "1") or state 4 (e.g., next data bit is a "0"). When in state 3, the possible next states are state 1 (e.g., next data bit is a "1") or state 2 (e.g., next data bit is a "0"). When in state 4, the possible next states are state 3 (e.g., next data bit is a "1") or state 4 (e.g., next data bit is a "0").

FIG. 5B is similar to FIG. 5A, except that the states are associated with pulse widths, rather than data bits, associated with a 2/6 hybrid ECC/RLL encoding scheme. For example, when in state 1, the when the pulse width sequence determines whether the next state is state 1 or state 4. If the pulse width sequence is "5,3", the next state is state 1. If the pulse width sequence is "3,3", the next state is state 2. The same applies for the other states of the state machine. For example, when in state 2, the possible next states are state 1 (e.g., the pulse width sequence is "7,3") or state 4 (e.g., the pulse width sequence is "5,3"). When in state 3, the possible next states are state 6 (e.g., the pulse width sequence is "3,4") or state 7 (e.g., the pulse width sequence is "4,4"). When in state 4, the possible next states are state 6 (e.g., the pulse width sequence is "5,4") or state 7 (e.g., the pulse width sequence is "6,4"). When in state 5, the possible next states are state 3 (e.g., the pulse width sequence is "3,3") or state 2 (e.g., the pulse width sequence is "5,3"). When in state 6, the possible next states are state 3 (e.g., the pulse width sequence is "6,3") or state 2 (e.g., the pulse width sequence is "6,3"). When in state 7, the possible next states are state 8 (e.g., the pulse width sequence is "4,4") or state 5 (e.g., the pulse width sequence is "3,4"). When in state 8, the possible next states are state 8 (e.g., the pulse width sequence is "5,4") or state 5 (e.g., the pulse width sequence is "4,4").

The state machines depicted in FIGS. 5A and 5B are exemplary, and other state machines may be used to decode the received signal. For examples, other state machines may be used to decode signals encoded using other encoding schemes. Additionally, other types of decoders may use other decoding methodologies.

Figure 6:
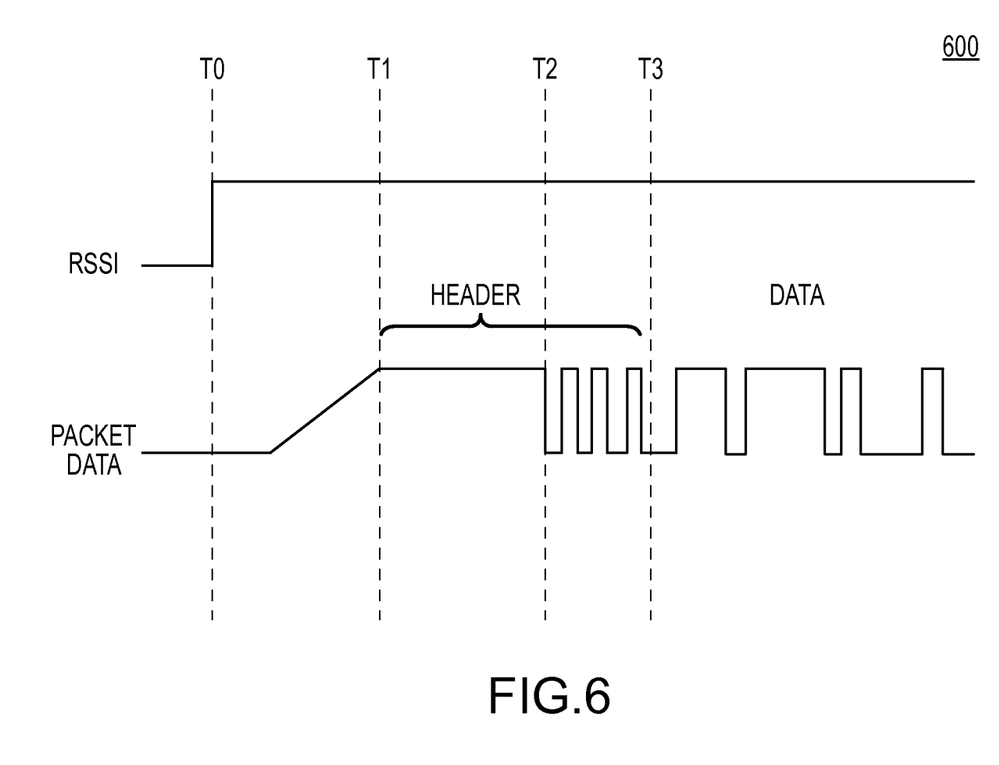
FIG. 6 is a timing diagram of an embodiment of receiving a packet at a base station according to an embodiment of the disclosure.

Referring to FIG. 6, an exemplary timing diagram of various signals received at a receiver via a power line during operation of a particular illustrative embodiment is disclosed and generally designated 600. For example, the exemplary timing diagram 600 may illustrate timing characteristics of a receiver 300 of FIG. 3 via a power line, as wirelessly transmitted by a sensor node 120(0 6) of FIG. 1 or a sensor node 220 of FIG. 2. The RSSI signal and the packet data signal may be as received by the computer 398 via the ADC 395 of FIG. 3.

In the exemplary timing diagram 600, prior to time T0, the RSSI signal and the packet data signal each have a low value. While the RSSI signal has a low value, any change in the packet data signal may be ignored by the decoder as noise on the power line. At time T0, the RSSI signal may transition to a logical high value. If the logical high value of a RSSI signal exceeds a voltage threshold, the decoder may determine that a transmitter is actively transmitting data. Between time T0 and time T1, the decoder may ignore any fluctuations of the packet data signal as noise. During that time, the packet data signal may transition to a logical high value. The time between T0 and T1 may be a predetermined amount of time from detection of the RSSI signal exceeding the threshold. In an embodiment, the time between T0 and T1 is 2.24 ms.

At time T1, the decoder may detect a header of the packet data signal based on the packet data signal exceeding a threshold. The header of the data packet signal may have two parts. For a first part from time T1 to T2, a long pulse may be received. For a second part from time T2 to T3, three short pulses may be received. A length of the long pulse between times T1 and T2 may be a longest possible pulse according to the encoding scheme used to encode the data, and a length of each of the short pulses between times T2 and T3 may be shortest possible pulses according to the encoding scheme used to encode the data. After time T3, the data begins to be received at the packet data signal, which may be decoded by the decoder to retrieve the originally transmitted data.

The exemplary timing diagram 600 is a non-limiting illustration to provide a sufficient understanding of embodiments of the disclosure. Those of ordinary skill in the art will appreciate that the relative timing of the signals of the exemplary timing diagram 600 may vary from system to system. For example, the relative timing between the long pulse and the shorts pulses of the header the packet data signal between times T1 and T3 may vary from the pulses depicted. Further, the pulses of the data of the packet data signal after time T3 may reflect the sensor data.

From the foregoing it will be appreciated that although specific embodiments of the technology have been described herein for purposes of illustration, various modifications may be made without deviating from the spirit and scope of the technology. For example, the sensor nodes can operate at a frequency other than 27.12 MHz (e.g., 13.56, 44 MHz, or another frequency). Also, in some embodiments the microcontroller can be omitted, or the battery can be larger. Further, certain aspects of the new technology described in the context of particular embodiments may be combined or eliminated in other embodiments. Moreover, while advantages associated with certain embodiments of the technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein. Thus, the disclosure is not limited except as by the appended claims.

What is claimed is:

1. A non-transitory computer readable medium comprising instructions that, when executed by one or more processing units, cause the one or more processing units to:
    receive a first signal and a second signal via a receiver coupled to a power line of a structure;
    detect a transition of the first signal to a first value at a first time;
    detect a start of header sequence of the second signal at a second time, wherein a time between the first time and the second time is a predetermined length of time;
    receive a data sequence of the second signal after the header sequence; and responsive to determining that the header sequence is a valid sequence, decoding the data sequence based on an encoding scheme.

2. The non-transitory computer readable medium of claim 1, further comprising instructions that, when executed by one or more processing units, cause the one or more processing units to determine a single bit length based on the header sequence.

3. The non-transitory computer readable medium of claim 1, further comprising instructions that, when executed by one or more processing units, cause the one or more processing units to decode the data sequence based on a bit sequence using a state machine.

4. The non-transitory computer readable medium of claim 1, wherein the first signal comprises a receive signal strength indicator (RSSI) signal and the second signal is a frequency discriminator signal.

5. The non-transitory computer readable medium of claim 1, further comprising instructions that, when executed by one or more processing units, cause the one or more processing units to convert the data sequence to a list of pulse widths.

6. The non-transitory computer readable medium of claim 1, further comprising instructions that, when executed by one or more processing units, cause the one or more processing units to decode the data sequence based on a run-length limited encoding scheme, a block code coding scheme, or a convolutional coding scheme.

7. An apparatus, comprising:
a base station configured to receive signals from a power line of a structure by coupling to the power line through an electrical outlet, the base station including a receiver configured to receive a signal strength indicator (RSSI) signal and a data output signal, wherein the receiver is further configured to detect a transition of the RSSI signal to a value greater than a threshold value at a first time, the receiver further configured to detect a header sequence of the data output signal at a second time that is different than the first time, the receiver further configured to receive a data sequence of the data output signal after the header sequence, and wherein the receiver is further configured to decode the data sequence based on an encoding scheme.

8. The apparatus of claim 7, wherein a time between the first time and the second time is a predetermined length of time.

9. The apparatus of claim 7, wherein the receiver is further configured to determine a length of the data sequence based on a time between an end of the header sequence and the RSSI signal dropping below the threshold.

10. The apparatus of claim 7, wherein the receiver is further configured to determine wherein the header sequence is a valid header sequence based on correlation between the header sequence and a predetermined template.

11. The apparatus of claim 7 wherein the encoding scheme is a block code, a run length limited code, or a convolutional code.

12. The apparatus of claim 10, wherein the valid header sequence includes a sequence of bits sent using a frequency shift keying (FSK) modulation.

13. The apparatus of claim 10, wherein the valid header sequence includes a Barker code sequence.

14. A method, comprising:
receiving a first signal and a second signal via a power line of a structure, wherein the first signal and the second signal are each wirelessly coupled to the power line;
determining a time when the first signal a transitions to a value greater than a threshold value;
determining a time when a header sequence of the second signal begins after the time when the first signal transitions to the value greater than the threshold;
receiving a data sequence of the second signal following the header sequence; and
decoding the data sequence based on an encoding scheme.

15. The method of claim 14, wherein the data sequence is decoded responsive to the header sequence being a valid sequence.

16. The method of claim 14, further comprising:
determining whether a time difference between the time when the first signal transitions to a value greater than a threshold value and the time when the header sequence of the second signal begins is approximately a predetermined time; and
responsive to the determination that the time difference is approximately the predetermined time, determining the data sequence is part of a valid packet.

17. The method of claim 14, wherein the encoding scheme is a convolutional encoding scheme, a block code encoding scheme, or a run-length limited encoding scheme.

18. The method of claim 14, further comprising determining a length of a packet that includes the data sequence based on a time between the end of the header sequence of the second signal and a value of the first signal transitioning below the threshold value.

19. The method of claim 15, further comprising determining whether the header sequence is the valid sequence.

20. The method of claim 18, wherein determining whether the length of the packet is equal to an expected length.

* * * * *